E. R. BOLING.
EXPANSIBLE PULLEY.
APPLICATION FILED MAR. 26, 1918.

1,299,669. Patented Apr. 8, 1919.

INVENTOR
Edgar R. Boling,

WITNESSES
Albert Davis
Ernest L. Walker.

BY Richard B. Owen.

ATTORNEY

UNITED STATES PATENT OFFICE.

EDGAR R. BOLING, OF HANNIBAL, MISSOURI.

EXPANSIBLE PULLEY.

1,299,669.  Specification of Letters Patent.  Patented Apr. 8, 1919.

Application filed March 26, 1918. Serial No. 224,781.

*To all whom it may concern:*

Be it known that I, EDGAR R. BOLING, a citizen of the United States, residing at Hannibal, in the county of Marion and State of Missouri, have invented certain new and useful Improvements in Expansible Pulleys, of which the foregoing is a specification.

In the operation of milling and agricultural machinery, it is frequently necessary to adjust the drive belt in order to prevent slipping. It is not always convenient to compensate for slack by shortening the belt, hence the desirability of providing other means for taking up slack in the belt to insure positive engagement between it and the coöperating pulleys.

In accordance with the present invention, a pulley is provided which may be enlarged diametrically so as to compensate for slack in the drive belt when the same occurs. Moreover, by providing an expansible pulley the diameter of the same may be reduced or enlarged to meet existing conditions, because at times the drive belt may contract, thereby necessitating a reduction in the diameter of the pulley in order to prevent straining of the parts and also to enable the drive belt being placed in position.

The present invention contemplates a combined expansible belt pulley and clutch whereby the pulley may be thrown into or out of action and expanded or contracted to meet varying conditions as may be found necessary.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawings.

Corresponding and like parts are referred to in the following description and indicated in both views of the drawings by like reference characters.

Figure 1:
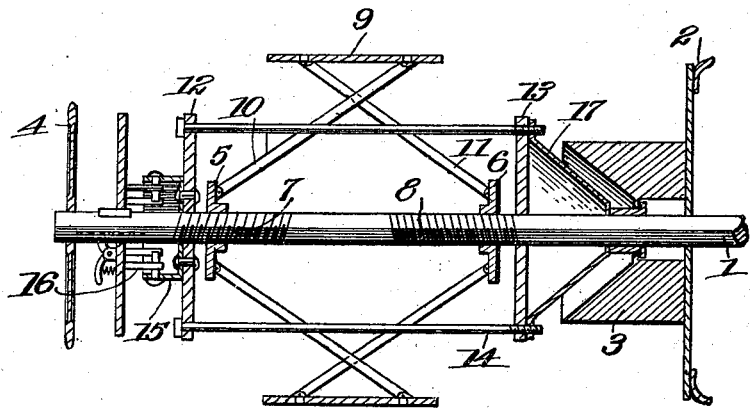
Figure 1 is a central longitudinal section of an expansible pulley embodying the invention, the tread sections and their connections intermediate the top and the bottom tread sections being omitted.
Figure 2:
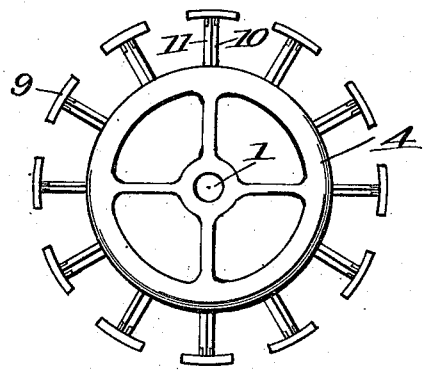
Fig. 2 is an end view thereof.

The pulley is mounted on a shaft 1 on which is secured a member 2 and a clutch element 3. A hand wheel 4 is also secured on the shaft 1 and constitutes means whereby the shaft may be rotated under certain conditions to admit of the diameter of the pulley being varied.

The pulley comprises a relatively fixed inner portion and an outer expansible portion. The inner portion is loose on the shaft 1 and is adapted to be clutched thereto. The outer portion is expansible and comprises two members 5 and 6 which are internally screw threaded to match corresponding threaded portions 7 and 8 of the shaft. The parts 7 and 8 are oppositely threaded, *i. e.*, one of such threads is right hand and the other left hand. Rotation of the shaft 1 in one direction will cause the members 5 and 6 to move toward each other, thereby resulting in expanding the pulley. Rotation of the shaft 1 in a reverse direction effects movement of the members 5 and 6 away from each other, thereby contracting the diameter of the pulley. The rim of the pulley comprises a plurality of sections 9, and links 10 and 11 connecting opposite end portions of the sections with the members 5 and 6. These links cross each other and are pivotally connected at their outer ends to the sections 9 and are similarly connected at their inner ends to the members 5 and 6. The threads 7 and 8 being of like pitch effect a uniform movement of the members 5 and 6 with the result that the elements 9 always remain parallel at all stages of their adjustment.

The inner portion of the pulley comprises end pieces 12 and 13 and drive-rods 14, the latter extending parallel with the shaft 1 and having their ends connected in any manner to the respective parts 12 and 13. The links 10 and 11 extend across the path of the ties 14, hence both parts of the pulley are caused to rotate when the shaft 1 is in active operation. The central portion of the pulley is mounted loosely upon the shaft 1 and is provided at one end with a clutch element 15 which is adapted to coöperate with an accompanying clutch element 16 splined to the shaft 1. When the clutch element 16 is moved outwardly so as to clear the clutch element 15, the shaft 1 may be rotated by means of the hand wheel 4 so as to vary the diameter of the pulley as may be required. After the diameter of the pulley has been adjusted, the clutch member 16 is moved inward to clutchingly engage the element 15, thereby clutching the pulley to the shaft 1 whereby both parts will rotate in unison. The shaft 1 may be mounted in any desired manner, and the clutches 15 and 16 may be of any type so long as it suffices to engage the pulley with the shaft. A clutch member 17 is disposed at the opposite end of the central portion of the pulley and coöperates with the clutch element 3 to clutchingly engage the pulley with the part 2 when the latter is to be rotated.

What I claim is:

1. An expansible pulley, comprising a shaft having portions reversely threaded, a pulley mounted on said shaft and comprising inner and outer portions, the inner portion consisting of spaced members connected by ties and the outer portion comprising elements mounted upon the reversely threaded portions of the shaft, pulley rim sections, and links connecting the pulley rim sections with the members engaging the reversely threaded portions of the shaft, said links crossing and extending across the path of the ties connecting the spaced parts of the inner portion of the pulley.

2. An expansible pulley, comprising a shaft having portions reversely threaded, spaced members loose on the shaft, ties connecting the spaced members, a clutch connecting one of said spaced members to the shaft, other members mounted upon the reversely threaded portions of the shaft, pulley rim sections, and crossing links pivotally connecting the pulley rim sections with the members mounted upon the reversely threaded portions of the shaft.

In testimony whereof I affix my signature in presence of two witnesses.

EDGAR R. BOLING.

Witnesses:
C. H. BOLING,
T. A. BOLING.

Copies of this patent may be obtained for five cents each, by addressing the "Commissioner of Patents, Washington, D. C."